United States Patent [19]

Aldrich et al.

[11] Patent Number: 4,846,908
[45] Date of Patent: Jul. 11, 1989

[54] PROCESS FOR PREPARING A FIBER REINFORCED RESIN MATRIX PREFORM

[75] Inventors: Donald C. Aldrich, Kennett Square, Pa.; Robert C. Buchanan, Greenville; John F. Sollinger, Newark, both of Del.

[73] Assignee: E. I. Du Pont de Nemours and Company, Wilmington, Del.

[21] Appl. No.: 34,313

[22] Filed: Apr. 3, 1987

[51] Int. Cl.[4] .............................................. D04C 3/40
[52] U.S. Cl. ...................... 156/148; 156/149; 156/311; 156/312; 156/393
[58] Field of Search .............. 156/148, 189, 149, 393, 156/311, 312, 87; 264/257, 258; 87/2, 8, 9, 23

[56] References Cited

U.S. PATENT DOCUMENTS

| 2,600,843 | 6/1952 | Bush | 156/312 X |
|---|---|---|---|
| 2,683,105 | 7/1954 | Forbes et al. | 156/312 |
| 3,660,193 | 5/1972 | Bolton | 156/169 |
| 3,960,635 | 6/1976 | La Roy et al. | 156/311 X |
| 4,244,853 | 1/1981 | Serafini et al. | 427/211 X |
| 4,264,671 | 4/1981 | Gillern et al. | 156/312 X |
| 4,309,473 | 1/1982 | Minamisawa et al. | 156/189 X |
| 4,385,952 | 5/1983 | Futakuchi et al. | 156/174 |
| 4,394,467 | 7/1983 | Edelman | 523/205 |
| 4,494,436 | 1/1985 | Kruesi | 87/23 |
| 4,512,836 | 4/1985 | Tucci | 156/174 |
| 4,600,617 | 7/1986 | Cole | 428/64 |
| 4,603,071 | 7/1986 | Wehnert et al. | 428/112 |

Primary Examiner—Michael W. Ball
Assistant Examiner—Jeff H. Aftergut

[57] ABSTRACT

Process for preparing preforms and composite articles from carbon fiber reinforced matrix resins braided to shape on a mandrel and then converting to final composite article by fully or partially curing in a mold followed by post curing if required.

3 Claims, 4 Drawing Sheets

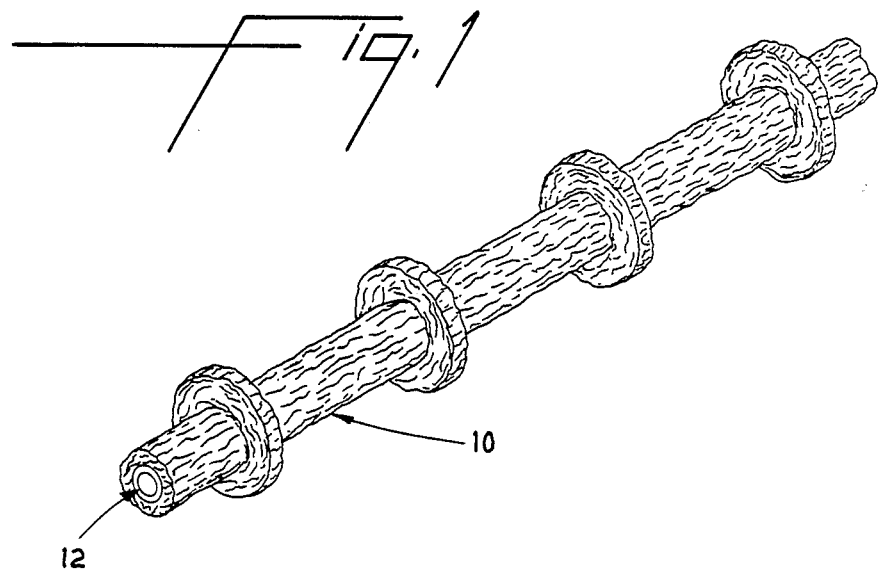
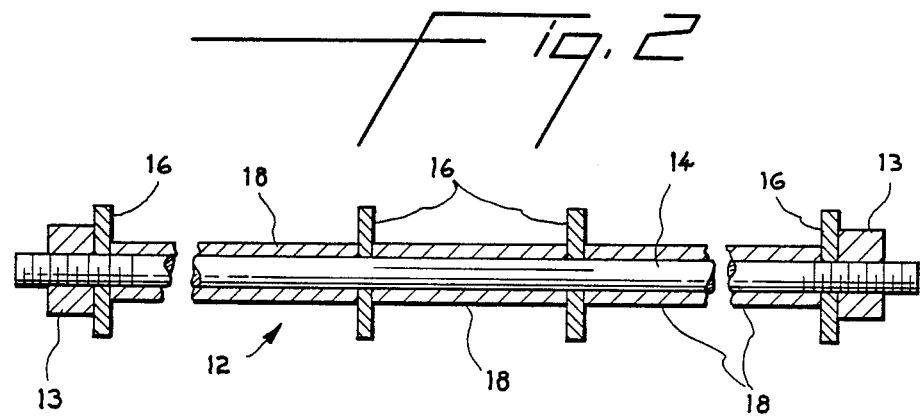
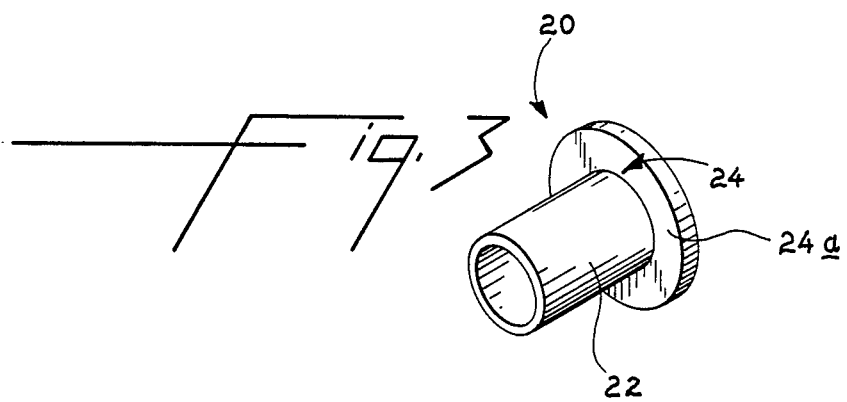

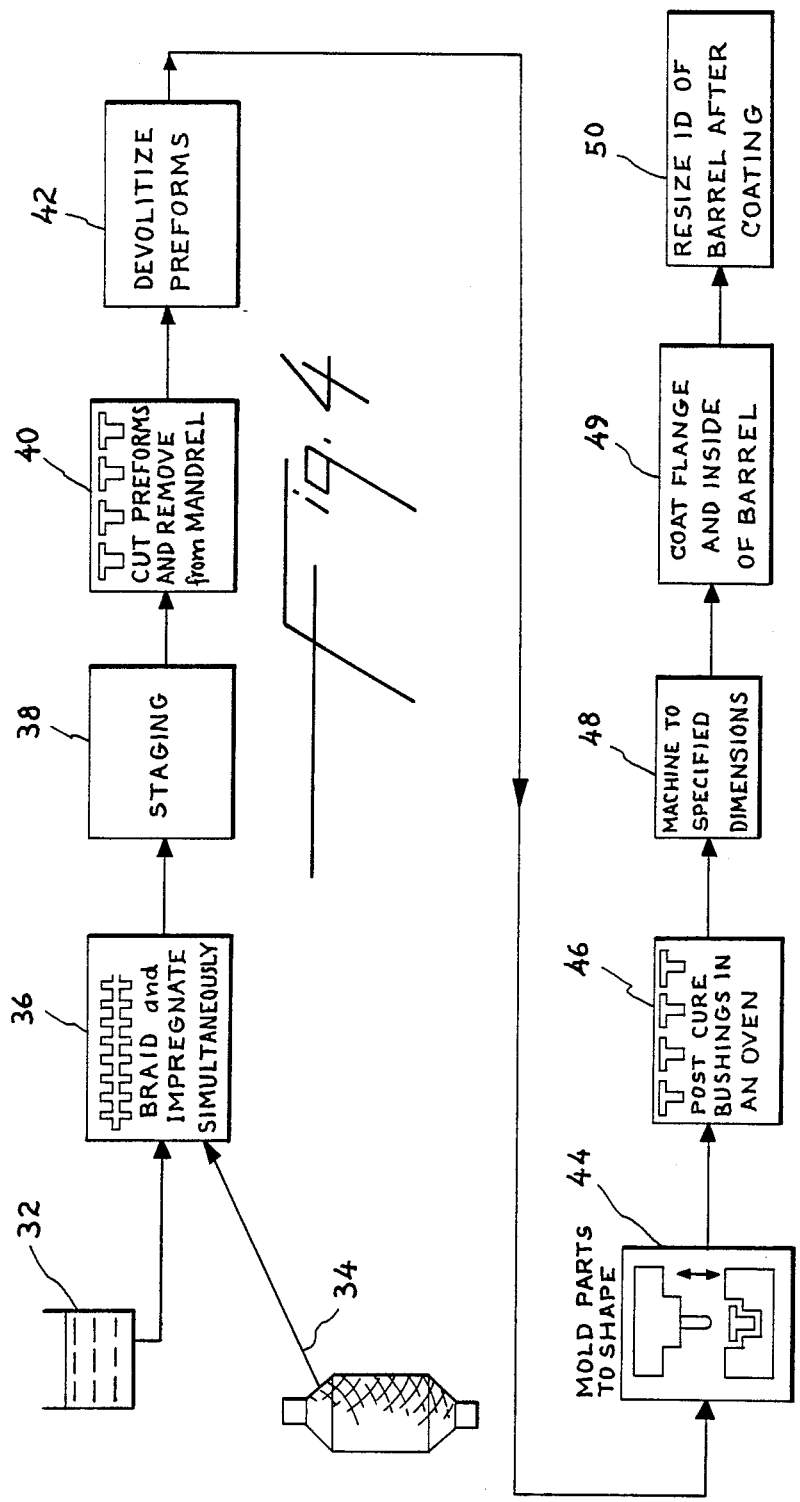

PROCESS FOR PREPARING A FIBER
REINFORCED RESIN MATRIX PREFORM

BACKGROUND OF THE INVENTION

This invention relates to braiding fibers into a preform shape, and more particularly, it relates to composite article of fiber reinforced resin matrix formed from a braided preform.

Fiber-reinforced plastic structures have been used for many years with increasing success because of their high strength, light weight and ease of fabrication compared to the wood or metal structures which they replace. Fibers such as glass, carbon and aramid are popular as reinforcement, and resins such as polyester, phenolic and epoxy are common polymeric matrices.

Polymeric materials reinforced with continuous filaments are used as precursors for highly-stressed parts such as aerospace components requiring high strength with low weight and which offer other advantageous properties such as thermal oxidative stability and lubricity.

It is known to adapt commercial braiding equipment to produce fiber reinforced resin components. Impregnation has been accomplished by using pre-impregnated fibers in the braiding operation or by continuously impregnating the fibers with resin during braiding as disclosed by Kruesi in U.S. Pat. No. 4,494,436. However, when preparing preform articles by braiding on a support mandrel, it is essential that the preform be self-supporting when removed from the mandrel yet having sufficient volatile content to minimize the loss of resin due to mechanical handling in further processing steps. The loss of resin occurs when the preform becomes too dry and the resin breaks or flakes off the preform when it is handled.

Even using state of the art technology to form the final composite part, the dimensional and performance requirements of aircraft and aerospace components and the need to provide high quality components at a low cost are difficult to achieve.

SUMMARY OF THE INVENTION

This invention provides a self-supporting braided-to-shape fiber reinforced matrix preform for a composite article that has a shape approximating the net shape of the composite article. The preform is braided with 32 carriers at a braiding angle of from about 54 degrees to about 63 degrees with respect to the longitudinal axis of the article and has a fiber volume of from about 40% to about 50%. The fully cured or completed composite article has a glass transition temperature in excess of about 330° C.

In forming the above article, a resin dissolved in a solvent is applied to the fiber while braiding the fiber as disclosed in U.S. Pat. No. 4,494,436 into a preform shape on a mandrel. The resin solution is applied at a rate to maintain a total resin solids of between 55% and 65% by weight of the preform shape. The braided preform is heated on the mandrel in an oven to reduce the volatile content to a point where the preform retains its shape when removed from the mandrel but where the loss of resin due to mechanical handling is minimized. The braided preform is cooled then removed from the mandrel as individual preform articles and heated again in an oven to further reduce the volatile content to from about 1% to about 5% by weight of the preform then cooled and molded as follows:

(1) Load preform article into a press and start cycle manually.
(2) Begin ramping the temperature of the preform to desired level.
(3) Close press until it just "kisses" preform.
(4) Bump (i.e. open and reclose) the press a plurality of times as temperature of the preform ramps up to desired level.
(5) When the temperature of the preform reaches a preset level, apply a predetermined force and begin a predetermined dwell time.
(6) Bump the press every 30 seconds during the dwell time.
(7) At the end of the dwell time, initiate air cooling.
(8) When the temperature of the preform drops below the preset level, begin cooling.
(9) When the temperature of the article reaches a predetermined temperature, open the press and remove the preform.

The article is then machined to specific dimensions, coated with a lubricant and resized after coating.

BRIEF DESCRIPTION OF THE DRAWINGS

FIG. 1 is a perspective view of a preform braided to shape a mandrel.

FIG. 2 is a side elevation of a mandrel suitable for use in braiding the preform of FIG. 1.

FIG. 3 is a perspective view of the finished composite article.

FIG. 4 is a block flow diagram illustrative of the process for forming the composite article of this invention.

DETAILED DESCRIPTION OF THE ILLUSTRATED EMBODIMENT

Figure 5:
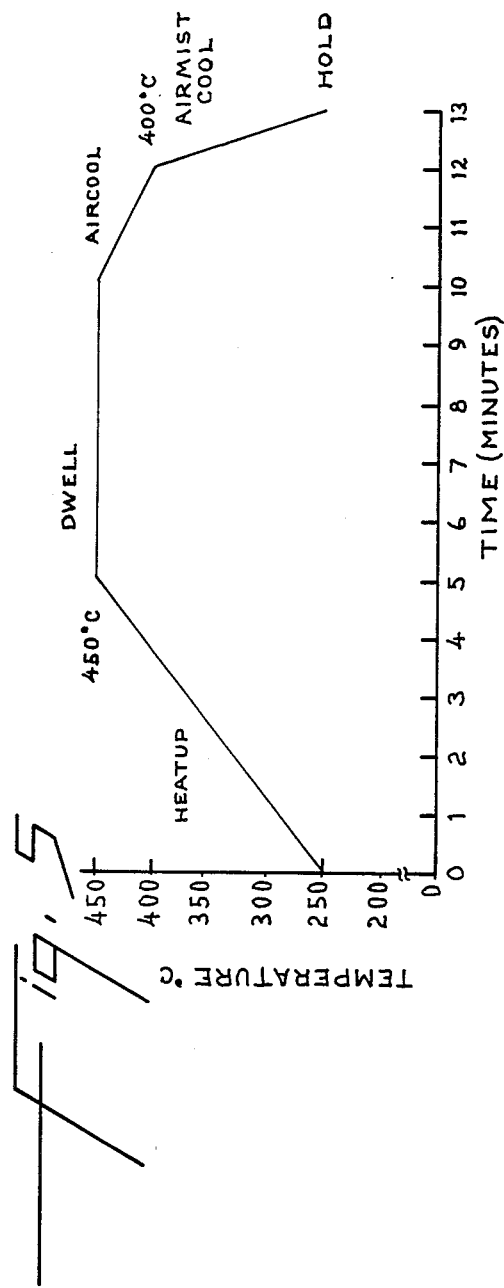
FIGS. 5 and 6 are temperature and pressure versus time, respectively, of the molding process for the composite article.

Referring to FIGS. 1-3, the embodiment chosen for purposes of illustration is a flanged bushing that is formed from a prepreg 10 of a carbon fiber impregnated with a polyimide resin braided around a metal mandrel 12. The resin is applied to the fiber as a solution of resin solids dissolved in a solvent, such as diethylene glycol dimethyl ether (diglyme). The mandrel 12 consists of a shaft 14, threaded on both ends, a plurality of washers 16 positioned at fixed locations by sleeves 18. Both the washers and sleeves are a sliding fit over shaft 14. The sleeves and washers are held in fixed positions by nuts 13 threaded to each end of shaft 12.

The finished composite bushing 20 is shown in FIG. 3 and is seen to comprise a sleeve portion 22 and a flange 24 at one end of the sleeve formed in one piece.

Figure 6:
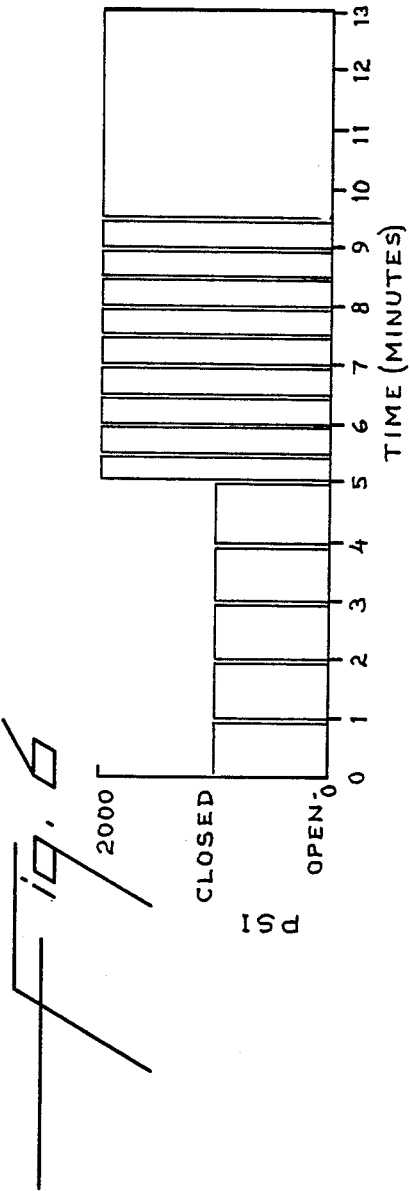
Figure 7:
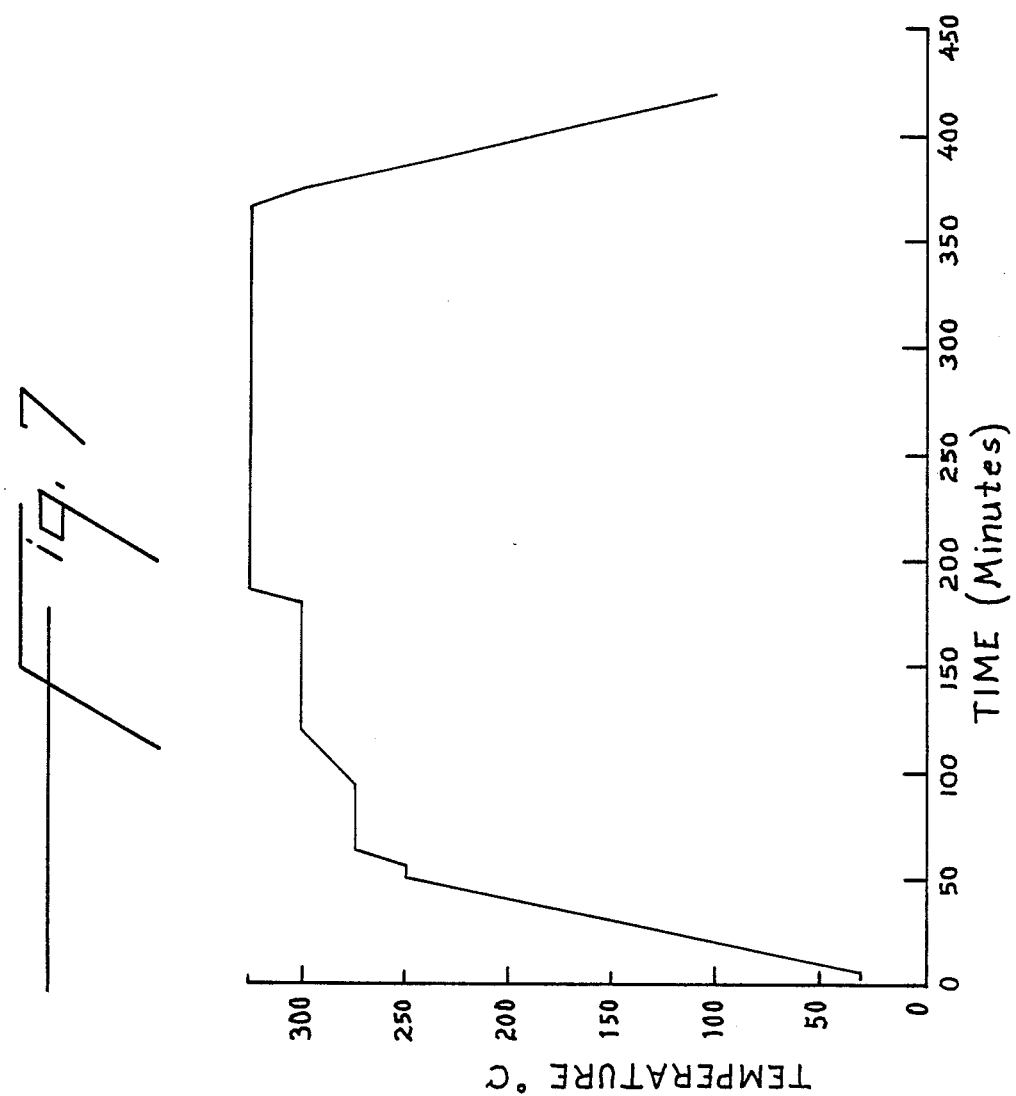
FIG. 7 is a time versus temperature plot for the composite article post curing step.

The process for forming bushing 20 is best understood by referring to FIG. 4, wherein a polyimide resin solution 30 in tank 32 and a carbon fiber yarn 34 are fed to a braiding machine 36 such as disclosed in U.S. Pat. No. 4,494,436 and a preform 10 is formed. Once the preform is braided to shape it is necessary to reduce the volatile content to prepare the preform for molding. This is accomplished in two steps. The first of these 38 is called staging wherein the prepreg is heated in an oven to a temperature of about 100° C. to reduce the volatile content to from about 13% to about 28% by weight of the preform. The preform is then cooled and removed from the mandrel in step 40 by cutting through the preform around the periphery of the washer and the sleeve at each location and then disassembling the mandrel by removing the nuts 13. The individual preforms are then heated in an oven to 185° C. in the second volatile removal step 42 called the devolatization step to reduce the volatile content to a level of between about 1% and about 5% by weight of the preform. The next step 44 involves molding the preform to shape in a mold. The molding process is best understood by referring to FIGS. 5 and 6. The preform is inserted into the mold cavity. The press is closed until it just "kisses" the preform and the temperature of the preform is ramped upwardly and the press is opened and reclosed (bumped) four times as the temperature ramps up to a desired level. When the temperature of the preform reaches the desired level of 442° C., 2000 psi is applied and a 5 minute dwell time is begun during which the press is opened and reclosed (bumped) every 30 seconds. At the end of the dwell time air cooling is initiated and when the temperature of the preform drops to 400° C., cooling is begun. When the temperature of the preform reaches 250° C. the preform is removed, cooled and transferred to an oven (step 46) where it is subject to the post curing temperature cycle shown in FIG. 7. Following the post cure step the composite article is machined to specific dimensions (step 48). This machining is done such that the material removed to control the thickness of flange 24 is machined from the flange surface 24a adjacent the sleeve portion 22 to obtain maximum flange strength. Selected surfaces of the article are then coated with a lubricant (step 49) and resized (step 50) to final dimensions.

Glass Transition Temperature

Glass transition temperature, which is defined as the point at which a property measured as a function of temperature changes abruptly, is measured via Thermal Mechanical Analysis (TMA) as disclosed in the Instruction Manual for 943 Thermomechanical Analyzer (TMA) published by the Du Pont Company Analytical Instruments Division, Wilmington, Del. 19898.

Percent Volatile Content

Percent volatile content is determined by placing a 2 to 3 gram sample of the preform into a tare weighted pan which is cured at a temperature of 343° C. in a furnace with a nitrogen bleed. The sample is cooled in a desiccator and reweighed. The percent volatiles is:

$$\% \text{ volatiles} = \frac{\text{initial sample wt.} - \text{final sample wt}}{\text{initial sample wt.}} \times 100$$

EXAMPLE I

Multiple preforms were constructed by braiding 5000 denier carbon fiber impregnated with a polyimide monomer binder solution over a mandrel of the type as shown in FIG. 2. The carbon fiber is designated Panex 30Y-5000D and supplied by the Stackpole Company. The binder solution is a solution of the composition disclosed in U.S. Pat. No. 3,959,350 and contains 47% to 49% by weight of cured resin solids of a stoichiometric mixture of 6F-Tetra acid and a 95::5 mixture of paraphenylenediamine and metaphenylenediamine dissolved in a solvent, diglyme. The mixture possesses a viscosity of 20000 Cp to 2000 Cp at room temperature. The braiding was performed on equipment according to the disclosure in U.S. Pat. No. 4,494,436. The preforms were braided to shape with a 32 carrier braid at 54 to 63 degree braid angle, with approximately 55% to 65% by weight of total cured resin solids.

The braided preforms, still on the mandrel, were partially staged by heating in an air circulating oven for sufficient time to reduce the total volatile content to typically 10–28 percent by weight of the preform, these conditions being sufficient to provide a preform which retains its shape when removed from the mandrel, but is not too dry as to lose excess resin when mechanically handled. The specific conditions used to accomplish this were as follows: Heat to 58° C., and hold at that temperature for 1 hour, then heat to 100° C. and hold at that temperature for 7 hours.

The partially staged braided to shape preforms were then cut into individual pieces and removed from the mandrel. The cutting was done so the preform is slightly larger than the desired finished part. The preforms were then further devolatilized in a circulating air oven at 185° C. for 30 minutes to attain a total volatile content of from about 1% to about 5% by weight of the preform.

The parts were then placed into a mold of appropriate dimensions to yield the desired finished part. The mold was heated per the schedule detailed in FIG. 5, and pressure was applied per the schedule of FIG. 6. The design of the mold was such that consolidation pressure was applied to the flange portion via the mold face and to the cylindrical barrel section via a tapered pin inserted into the central cavity of the part. Following the cure, the parts were removed from the mold and post cured per the schedule detailed in FIG. 7.

The completed part was machined where necessary to attain the desired dimension. The objective of the preceding steps and the design of the mold was such that the amount of machining required was minimized. However, where machining on the flange section was required to attain the desired thickness, it was found desirable to remove material from the surface adjacent to the sleeve section. This proved important in maximizing the strength of the flange. After again inspecting the part, a lubricant type coating was applied to selected surfaces of the bushing. Finally, the part was again machined if required to attain the desired dimensions, and thoroughly inspected to assure complete compliance with dimensional and visual specifications. The glass transition temperature of the parts was determined to be between 343° C. and 358° C.

EXAMPLE II

In this example the steps through the initial staging of the braided to shape preforms are identical to Example I. In this case, the preforms were devolatilized by heating over 30 minutes to 55° C., holding at that temperature for 1 hour, and then heating over the next 30 minutes to 110° C. and holding there for 7 hours. The resulting preform from this process having a total volatile content of from about 4% to about 5% by weight of the preform.

These preforms were then placed onto a cylindrical pin and inserted into a matched metal die clam-shell mold. The mold was then partially closed, and heated to 425° C. over approximately 6 minutes. Consolidation was achieved by first applying pressure to the flange portion, and then applying radial pressure to the barrel section. The part was cured in the mold by heating to 440° C. and holding at that temperature for at least 15 minutes. The part was cooled to 300° C. over 9 minutes and then further cooled to 200° C., where the pressure was released. After further cooling to room temperature, the part was removed from the mold. Since parts so processed met specifications without post cure, that step was eliminated, and the part was finished as detailed in Example I.

EXAMPLE III

Preforms are made using the same steps as in Example I up to the molding step, then the preforms are loaded into a preheated mold and inserted into a press held at 450° C. After 5 minutes in this mold, with a pressure cycle similar to the initial stages of FIG. 6, the part was transfered to a press maintained at a lower temperature such that the part cooled, under pressure, to 250° C. over 5 minutes. The remainder of the process was identical to the final steps of Example I.

We claim:

1. A process for preparing a fiber reinforced resin matrix preform for a composite article comprising: dissolving the resin in a solvent solution and applying said solution with said dissolved resin to the fiber while braiding said fiber into a preform shape on a mandrel; heating the braided preform on the mandrel in an oven in a first heating step to a temperature of about 58° C. and maintaining said 58° C. temperature for about 1 hour followed by raising said temperature to about 100° C. and maintaining said 100° C. temperature for about 7 hours to reduce the volatile content to from about 13% to about 28% by weight of the preform; cooling the preform on the mandrel and removing said preform from said mandrel, whereby said preform is self-supporting when removed from said mandrel while having sufficient volatile content to minimize a loss of resin due to handling; and heating said self-supporting preform in an oven in a second heating step to a tempeature of about 185° C. and maintaining said 185° C. temperature for about 30 minutes to reduce the volatile content to from about 1% to about 5% by weight of the preform and then consolidating the preform in a mold with heat and pressure to form a composite article.

2. The process of claim 1 including the further steps of forming a composite article from said preform comprising: consolidating a fiber reinforced resin matrix preform having a volatile content of from about 1% to about 5% by weight of the preform into a composite article by applying a predetermine force in a mold according to the pressure-time relationship of the graph shown in FIG. 6 thereto at an elevated temperature in said mold according to the time-temperature relationship of a curve as shown in FIG. 5, wherein the time relationship of FIG. 5 corresponds to the time relationship of FIG. 6.

3. The process as defined in claim 2 wherein said preform is then post cured in an oven according to a time-temperature relationship of a curve shown in FIG. 7 wherein the temperature lies within the range of from about 30° to about 350° C. for a time period of about 450 minutes at any point along the curve.

* * * * *